US012613344B2

(12) United States Patent
Renna et al.

(10) Patent No.: US 12,613,344 B2
(45) Date of Patent: Apr. 28, 2026

(54) METHOD FOR PERFORMING A CORRECTION OF AN IONOSPHERIC ERROR AFFECTING PSEUDO-RANGE MEASUREMENTS IN A GNSS RECEIVER, CORRESPONDING RECEIVER APPARATUS AND COMPUTER PROGRAM PRODUCT

(71) Applicant: STMICROELECTRONICS S.r.l., Agrate Brianza (IT)

(72) Inventors: Michele Renna, Cervinara (IT); Nicola Matteo Palella, Rivolta d'Adda (IT)

(73) Assignee: STMICROELECTRONICS S.r.l., Agrate Brianza (IT)

( * ) Notice: Subject to any disclaimer, the term of this patent is extended or adjusted under 35 U.S.C. 154(b) by 223 days.

(21) Appl. No.: 18/481,147

(22) Filed: Oct. 4, 2023

(65) Prior Publication Data

US 2024/0134056 A1 Apr. 25, 2024

(30) Foreign Application Priority Data

Oct. 12, 2022 (IT) ........................ 102022000021036

(51) Int. Cl.
*G01S 19/07* (2010.01)
*G01S 19/04* (2010.01)

(52) U.S. Cl.
CPC ............ *G01S 19/072* (2019.08); *G01S 19/04* (2013.01)

(58) Field of Classification Search
None
See application file for complete search history.

(56) References Cited

U.S. PATENT DOCUMENTS

2009/0224969 A1* 9/2009 Kolb ...................... G01S 19/44
342/357.27
2014/0009331 A1* 1/2014 Tominaga ............... G01S 19/40
342/357.23

(Continued)

FOREIGN PATENT DOCUMENTS

WO WO 2015020552 A1 2/2015
WO WO 2016034252 A1 3/2016
WO WO 2022039879 A1 2/2022

OTHER PUBLICATIONS

U.S. Appl. No. 18/612,586, filed Mar. 21, 2024.
(Continued)

*Primary Examiner* — Daniel L Greene
(74) *Attorney, Agent, or Firm* — Seed Intellectual Property Law Group LLP

(57) ABSTRACT

A method corrects an ionospheric error affecting pseudo-range measurements in a GNSS receiver receiving a plurality of satellite signals from a plurality of satellites of the constellation of satellites. The method is performed in a navigation processing procedure performed at a GNSS receiver, receiving pseudo-range measurements previously calculated by the GNSS receiver obtained from a first carrier signal and a second carrier signal in the satellite signals, in particular in GPS bands L1 and L5. The method includes performing a correction procedure of the pseudo-range measurements including applying to the pseudo-range measurements corrections for predictable errors obtaining corrected pseudo-ranges and applying to the corrected pseudo-range measurements a further ionospheric error correction calculation to obtain further ionospheric error correction values.

17 Claims, 7 Drawing Sheets

(56) References Cited

U.S. PATENT DOCUMENTS

| | | | | |
|---|---|---|---|---|
| 2015/0054686 A1* | 2/2015 | Sagiraju | .................. | G01S 19/39 |
| | | | | 342/357.73 |
| 2015/0226855 A1* | 8/2015 | Averin | .................. | G01S 19/426 |
| | | | | 342/357.44 |
| 2016/0370466 A1* | 12/2016 | Rougerie | .............. | G01S 19/072 |
| 2017/0192098 A1* | 7/2017 | Cho | ..................... | G01S 19/072 |
| 2024/0329259 A1 | 10/2024 | Palella et al. | | |

OTHER PUBLICATIONS

Basile et al., "Multi-Frequency Precise Point Positioning Using GPS and Galileo Data with Smoothed Ionospheric Corrections," 2018 IEEE, p. 1388-1398.
Kim et al., "Adaptive Carrier Smoothing Using Code and Carrier Divergence," ION NTM 2007, Jan. 22-24, 2007, San Diego, CA, pp. 141-152.
Reddy et al., "Performance Evaluation of Single and Dual Frequency Carrier Smoothing techniques for LAAS," 2011 IEEE. (4 pages).
Vasudha et al., "Comparative Evaluation of IRNSS Performance with Special Reference to Positional Accuracy," Gyroscopy and Navigation 8(2):59-72, 2017.
Zhao et al., "Novel adaptive Hatch filter to mitigate the effects of ionosphere and multipath on LAAS," Journal of Systems Engineering and Electronics 21(6):1046-1053, Dec. 2010.

* cited by examiner

METHOD FOR PERFORMING A CORRECTION OF AN IONOSPHERIC ERROR AFFECTING PSEUDO-RANGE MEASUREMENTS IN A GNSS RECEIVER, CORRESPONDING RECEIVER APPARATUS AND COMPUTER PROGRAM PRODUCT

BACKGROUND

Technical Field

Embodiments of the present disclosure relate to solutions concerning performing a correction of an ionospheric error affecting pseudo-range measurements in a global navigation satellite system (GNSS) receiver.

The present disclosure refers to techniques for performing a correction of an ionospheric error affecting pseudo-range measurements in a GNSS receiver using the L1 and L5 carrier.

Description of the Related Art

In several applications and user cases (automotive, consumer fields) a Position Sensor (PS) is utilized. It is an electronic device composed by a GNSS receiver and a processor aiming to provide accurate position information to user application.

To calculate user position, the processor combines the distance measurements (also known as pseudo-ranges) between user and all the satellites in view measured by the GNSS receiver following a process called triangulation. Final position accuracy reflects the quality of such measurements. They are affected by several error factors that are compensated successfully in receiver processing according to the state of the art.

In particular, the GNSS receiver elaborates the elapsed time between satellite signal transmission and reception. This equals the distance between user and satellites (also known as pseudo-range). Combining the distance measurements from several satellites through a triangulation technique the GNSS device determines user position accurately. Some errors are present on the distance measurements, and it is beneficial if they are compensated by the receiver in order to preserve position accuracy. They include delays introduced by signal generation in satellite HW/SW; errors due to earth rotation; delays caused by troposphere; delays caused by receiver design; delays caused by ionosphere.

All the error causes listed above, with the exception of signal delays caused by ionosphere, are predictable and compensated into the receiver either using standard modelling techniques or using compensation parameters downloaded by the satellite communication itself.

The signal delays caused by ionosphere crossing are not always predictable. In particular, one critical error factor is the delay accumulated by GNSS signals while crossing the ionosphere layer. The latter are depending on the level of solar activity modulating ionosphere electron content. Hence, in certain conditions (daytime, low latitude areas, periods of nonstandard sun activity such like solar storms) the amount of error caused by this is not predictable and may affect the solution. In particular, activity on solar surface charges ionosphere atmospheric layer during daytime, causes an increase of its Total Electron Content (TEC— expressed in electrons/m$^3$). The higher is TEC, the higher is the delay accumulated by electromagnetic signals while crossing it. The higher the signal carrier frequency, the smaller the delay, e.g., 1 TEC unit causes 16 cm equivalent error on distance measurement, since a storm can determine an increase of tenth of TEC units, this translates in error of meters.

Dual frequency GNSS receivers can cancel the ionospheric error combining distance measurement taken from two different carriers transmitted by same satellites. However, this kind of combination introduces an additional amount of noise, hence its usage—while improving solutions in bad ionospheric conditions—if used in good solar condition is detrimental for performance.

In particular, a first known solution uses Klobuchar/ Nequick models. These are generic models implemented into standard receivers. They are updated daily with data downloaded by the satellites. They provide a good level of compensation cancelling 50-70% of errors derived in normal solar activity. Klobuchar/Nequick are conceived as global models, hence providing a compromise, not being optimized for a specific region, while ionospheric conditions vary very much from one continent to another.

A second known solution uses Satellite Based Augmentation Systems (SBAS). On top of classic GNSS constellations (global position system (GPS), Galileo, global navigation satellite system (GLONASS) . . . ) political actors from different areas may issue specific local satellite systems aiming to gather signal statistics for a given area and elaborate corrections for the ionospheric error tailored for a specific place. By way of example, Europe features the European Geostationary Navigation Overly Service (EGNOS) satellite system; North America the Wide Area Augmentation System (WAAS) system; Japan the Quasi-Zenith Satellite System (QZSS); India the Indian Regional Navigation Satellite System (IRNSS). With respect to the Klobuchar/Nequick models, SBAS has the advantage to provide ionospheric compensation data that are optimized for the specific geographic area in which the user is located. However, the time granularity of the provided information is still daily at least, meaning that SBAS is not able to cope with non-standard ionospheric behavior caused by abnormal solar activity.

A third solution uses a combination of distance measurements from different broadcasted frequencies. Some GNSS constellations transmit two different signals on different carriers. Receivers that are capable to receive both frequencies can perform a linear combination/difference of the two distance measurements obtained for each satellite. Such combination is known in the art as Iono-Free Linear combination (IFLC) and produces a new distance measurement for given satellite which is free from any ionospheric effect. IFLC is virtually eliminating 100% of ionospheric induced error, however, being a difference, it increases by a fixed amount the noise floor of distance measurements. So, while the outliers related to extreme solar activity are removed, the typical accuracy in normal condition is worse than standard methods. Additionally, the difference is influenced by potential other biases present on the measurements. For example, in urban environments, signal reflections caused by tall buildings deteriorate the quality of IFLC measurements. Finally, not all the satellites feature dual frequency transmission; hence there is less availability of such measurements compared to single frequency ones.

Therefore the known solutions present each the above different drawback, making it difficult to have accurate measurements in every condition.

BRIEF SUMMARY

In view of the above, the present disclosure provides solutions which overcome one or more of the above drawbacks.

As mentioned before, one embodiment is a method for performing a correction of an ionospheric error affecting pseudo-range measurements in a GNSS receiver receiving a plurality of satellite signals from a plurality of satellites of the constellation of satellites. The method may be implemented in a navigation processing procedure performed at a GNSS receiver The method includes receiving pseudo-range measurements previously calculated by said GNSS receiver obtained from a first carrier signal and a second carrier signal in said satellite signals, in particular in GPS bands L1 and L5. The method includes performing a correction procedure of said pseudo-range measurements including compensating pseudo-range measurements for predictable errors obtaining corrected pseudo-ranges and applying to said corrected pseudo-range measurements a further ionospheric error correction calculation to obtain further ionospheric error correction values. The method includes performing a position calculation operation processing said corrected pseudo-range measurements and said ionospheric error corrections values and outputting position, velocity and time information of the GNSS receiver. Said applying to said corrected pseudo-ranges a further ionospheric error correction calculation to obtain further ionospheric error correction values includes performing one or more checking operations enabling performing a ionosphere free linear combination on said pseudo-range measurements obtaining ionospheric free linear combination pseudo-range measurements and supplying it to said position calculation operation only, otherwise performing a standard ionospheric error correction derived from GNSS navigation data, in particular by Klobuchar/ Nequick models and/or SB AS, supplying the correspondingly standard ionospheric corrected pseudo-range measurements to said position calculation operation. Said performing one or more checking operations includes evaluating a solar activity and enabling performing said ionospheric free linear combination if the solar activity is above a given threshold.

In variant embodiments, said performing one or more checking operations further includes performing, prior to said evaluating a solar activity one or more operations checking if the receiver is in condition to correctly measure said solar activity.

In variant embodiments, said one or more operations checking if the receiver is in condition to correctly measure said solar activity, include one or more of: checking if the latitude is below a latitude threshold, checking if a day condition is occurring, checking if the GNSS receiver is in an urban environment.

In variant embodiments, said performing one or more checking operations include a sequence of the operations: checking if the latitude is below a latitude threshold, checking if a day condition is occurring, checking if the GNSS receiver is in an urban environment, evaluating a solar activity and enabling performing said ionospheric free linear combination if the solar activity is above a given threshold, each of said operations enabling the execution of the following operation in the sequence.

In variant embodiments, said evaluating a solar activity and enabling performing said ionospheric free linear combination if the solar activity is above a given threshold includes receiving a as input the pseudo-range from the first carrier or second carrier and the ionospheric free linear combination pseudo-range measurements. The method includes calculating a dual frequency estimated ionospheric error correction for a given satellite as the difference between the pseudo-range from the first carrier or second carrier and the ionospheric free linear combination pseudo-range measurements. The method includes calculating of a correction difference as the difference of the dual frequency estimated ionospheric error correction for the i-th satellite with respect to a broadcasted correction, calculated as standard ionospheric error correction derived from GNSS navigation data, in particular by Klobuchar/Nequick models and/or SBAS. The method includes accumulating said correction difference over the whole constellation of satellites in view and averaging over the number of satellites in view, yielding a delta ionospheric error metric, in particular between said accumulation step and averaging step checking if new satellites are available, in the affirmative returning to the step of calculating a dual frequency estimated ionospheric error correction, otherwise performing the averaging step. The method includes low pass filtering, in particular by a IIR filter, said delta ionospheric error metric obtaining an ionospheric metric solar activity indicator. The method includes checking if said ionospheric metric solar activity indicator falls above a given threshold, in the affirmative enabling performing an ionosphere free linear combination on said pseudo-range measurements obtaining ionospheric free linear combination pseudo-range measurements and supplying it to said position calculation operation only.

In variant embodiments, said checking if the GNSS receiver is in an urban environment includes inputting the standard pseudo-range measurements to a least square regression operation to calculate raw user position data from pseudo-range data, supplying residual errors for each pseudo-range measurement derived from said least square calculation, picking the maximum value among such residual errors, performing a low pass filtering, in particular IIR filtering, on said maximum residual error value obtaining a urban environment indication value, checking if said urban environment indication value is greater than a respective threshold in the affirmative detecting and signaling that the receiver is in an urban condition, otherwise an open sky condition is detected and signaled.

The present disclosure relates also to a receiver apparatus configured to perform the method of any of the previous embodiments.

The present disclosure relates also to a computer program product directly loadable into the internal memory of a digital computer, including software code portions for performing the steps of the method of any of the previous embodiments.

BRIEF DESCRIPTION OF THE SEVERAL VIEWS OF THE DRAWINGS

Embodiments of the present disclosure will now be described with reference to the annexed drawings, which are provided purely by way of non-limiting example and in which.

DETAILED DESCRIPTION

In the following description, numerous specific details are given to provide a thorough understanding of embodiments. The embodiments can be practiced without one or several specific details, or with other methods, components, materials, etc. In other instances, well-known structures, materials, or operations are not shown or described in detail to avoid obscuring aspects of the embodiments.

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The headings provided herein are for convenience only and do not interpret the scope or meaning of the embodiments.

A navigation receiver operates by down converting to quasi baseband the input signal received from the satellites, which is transmitted at L band (1-2 GHz), using a local oscillator to step down the input frequency and allow a baseband digital management of the Satellite information.

Figure 1:
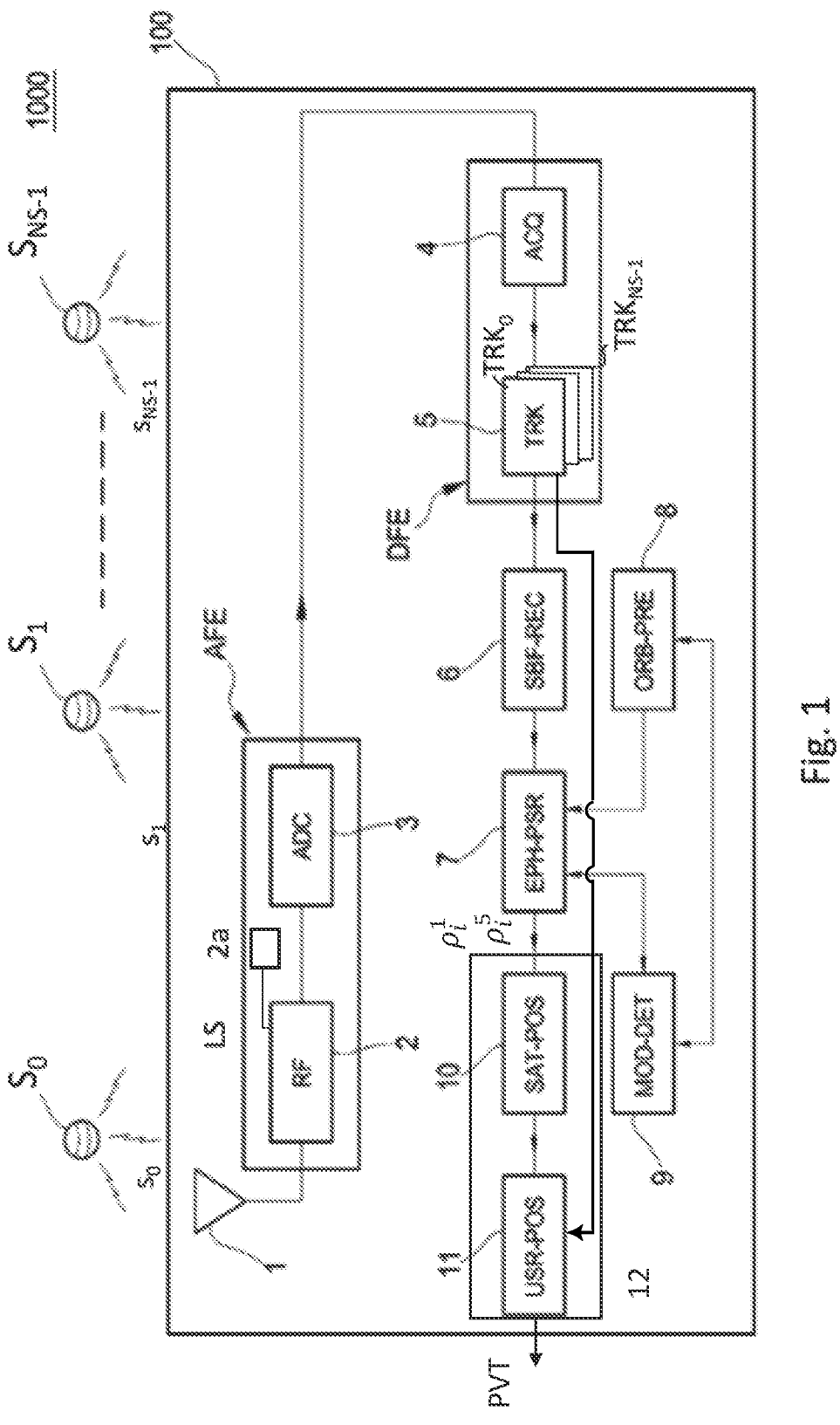
FIG. 1 is a schematic diagram showing a GNSS (Global Navigation Satellite System) receiver.

With reference to FIG. 1, which diagrammatically shows a GNSS (Global Navigation Satellite System) system 1000 (such as, for example, Global Positioning System (GPS), Global'naya Navigatsionnaya Sputnikovaya Sistema (GLO-NASS), Galileo System, or other types of satellite-based positioning systems, such global satellite positioning system 1000 includes a constellation of a number NS of satellites $S_1$-$S_{NS}$ and at least a receiving apparatus 100. The satellite signals used in the GNSS (Global Navigation Satellite System) are of the CDMA-type (Code Division Multiple Access). The satellite signals reception at the receiving apparatus 100 is implemented through the following, sequentially performed, standard steps: analog filtering, frequency conversion and digitization, acquisition, tracking, decoding and positioning.

The receiving apparatus 100 includes an antenna 1, an analog receiving module AFE (Analog Front End), provided with a radiofrequency (RF) stage 2, and an analog-digital converter 3 (ADC), which can be implemented by hardware modules.

Further, the receiving apparatus 100 includes a digital processing module DFE (Digital Front End), including an acquisition module 4 (ACQ), and a tracking module 5 (TRK).

Moreover, the receiving apparatus 100 is provided with a sub-frame recovery module (SBF-REC) 6, an ephemerides processing and pseudo-range calculation module 7 (EPH-PSR), a satellites orbits prediction module 8 (ORB-PRE), a satellite type detecting module 9 (MOD-DET), a satellite position calculation module 10 (SAT-POS), and a user position calculation module 11 (USR-POS).

In a particular embodiment, acquisition module 4, tracking module 5 can be implemented by hardware, while the remaining modules 6-11 can be implemented by software. In addition, it is observed that the acquisition module 4 and tracking module 5 can also be implemented by a hardware and software combination.

The receiving apparatus 100 is provided with a central processing unit, memories (mass memory and/or working storage) and respective interfaces (not shown in figures), including a microprocessor or microcontroller, for running the software resident in it.

The following embodiments are described in a non-limiting way referring to the GPS technology, however the teachings of the present disclosure can be applied also to other satellite positioning systems.

When the receiving apparatus 100 operates, the antenna 1 receives a plurality of signals $S_0$, . . . , $S_{NS-1}$ from one or more satellites $S_0$-$S_{NS-1}$ of the constellation of satellites operating in system 1000. For example, these signals can be modulated on a carrier having a frequency of about 1.5 GHz. Particularly, each received signal transports a pseudo-random code and a message for the data communication.

The pseudo-random code, known as CA code, for example at 1 MHz, is used for distinguishing a satellite from another, and enables the receiving apparatus 100 to measure the time instant at which has been transmitted a signal by a corresponding satellite. Pseudo-random code is implemented by a sequence of pulses, called chips.

The radio frequency stage 2 operates on the signals received by antenna 1 (of the analog type) and converts them to the base band or to an intermediate frequency. Analog-digital converter 3 converts the intermediate frequency signals to corresponding digital signals. The radio-frequency stage 2 operates the conversion at an intermediate frequency using the frequency of a local signal LS which may be supplied by a Temperature Compensated Crystal Oscillator (TCXO) 2a.

The acquisition block 4 identifies in the digital signals originated by the analog-digital converter 3 the satellites in visibility, testing their presence by trying to match their transmitted PRN (Pseudo Random Noise) code sequence, i.e., the CA code, with a corresponding local replica and when a peak confirmation is found it provides the initial GNSS information, i.e., code/frequency information to an elementary Intermediate Frequency tracking correlation block. Further, the acquisition module 4 detects a plurality of parameters associated to the satellites and used for time tracking the satellite.

The data navigation message transports data (for example at a bit rate equal to 50 Hz) and particularly is modulated based on the Binary Phase Shift Keying (BPSK) technique. Further, data navigation message is hierarchically divided in frames and sub-frames and transports several information, among them a plurality of parameters used for determining the orbit and consequently the position of satellites.

The tracking module 5 has plural tracking channels, indicated by a channel index I from 0 to NS−1, in particular indicated as $TRK_0$ . . . $TRK_{NS-1}$ and each is allocated to a different satellite of the constellation. Specifically, the tracking module 5 is configured to operate as carrier tracking loop, which can be designed to follow either the phase of the incoming signal—using Phase Lock Loops (PLL), or the Doppler frequency of the incoming signal using Frequency Lock Loops (FLL). Phase noise, residual fluctuation of the tracking process, is intended as a quality metric and it is adopted to identify the goodness of the tracking itself at a given carrier to noise Cn0.

The tracking module 5 is configured to supply data to the sub-frame recovery module 6, as a time sequence of samples pairs, indicated with {I, Q}. Each sample {I, Q} is for example the result of a coherent integration, respectively in-step and quadrature, of a bit of 20 ms, performed by a correlator based on the modulation technique Binary Phase Shift Keying (BPSK), each samples pair {I, Q} represents a transmitted bit.

Moreover, for each satellite, in the tracking module 5 the Doppler frequency and the transfer time of the GPS signal transmitted by a satellite $S_1$-$S_{NS}$ are determined.

Each $i^{th}$ tracking channel TRK, includes thus, in a way known per se, a frequency locked loop and also a carrier to noise ratio meter, which estimates the carrier to noise ratio C/No, for instance every N (e.g., 10) accumulation periods of frequency loop of the tracking channel, where the elementary coherent one is bounded by the bit length of the signal being considered, e.g., of 20 ms for the GPS L1/CA case, and aligned to the $1^{st}$ millisecond of the bit.

The sub-frame recovery module 6, by means of suitable algorithms, decodes the different received sub-frames forming the navigation data message. The ephemerides processing and pseudo-range calculation module 7 stores the satellite orbit, as ephemerides data, and calculates the existent distances between the satellites and the receiving apparatus 100: such distances are called pseudo-range. In FIG. 1 are indicated two pseudo-ranges, a raw pseudo-range measurement $$\rho_i^1$$

from a first carrier signal, in the example L1 carrier signal, for the $i^{th}$ satellite and a raw pseudo-range measurement from a second carrier signal, in the example L5 carrier signal, for satellite $$\rho_i^5.$$

The satellite position calculation module 10 calculates the positions of the satellites expressed by 3D coordinates, at the moment of transmission. The satellite position is uniquely produced by ephemeris data (contained in navigation data) and the time of the satellite system time. The ephemeris data and the satellite system time are contained in navigation data.

The satellite orbit prediction module 8 can be activated for assisting the ephemerides processing and pseudo-range calculation module 7 and/or satellite position calculation module 10 when the ephemerides data are not available at the receiving apparatus 100. The ephemeris (i.e., satellite position) and the pseudo-range are two separate produces of signal reception. In particular, the orbit prediction assists ephemeris but not the pseudo-range.

The satellite type detecting module 9 is configured to determine the type of the tracked satellite and by it the solar radiation pressure model to be used in the orbit prediction by the satellite orbit prediction module 8, according to modes that will be described in the following as examples. The satellite type detecting module 9 enables to determine the type of satellite in order to select the solar radiation pressure model which better provides for the shape, mass and size of a satellite.

In this embodiment, the ephemerides processing and pseudo-range calculation module 7 operates on the time for transferring the GPS signal together with the reception time (known due to a clock inside the receiving apparatus 100).

The ephemerides processing and pseudo-range calculation module 7 operates in order to evaluate how much time is required to the signal from each satellite for reaching the receiving apparatus 100, evaluating in this way the distance from the corresponding satellite (pseudo-range).

By a triangulation algorithm, the user position calculation module 11 calculates the position of the receiving apparatus 100 based on the distances of the receiving apparatus 100 preferably from at least four satellites and based on the positions of the same satellites, known at this processing stage. In the following, the position of the receiving apparatus 100 (practically coinciding with the user position) is be called "fix."

Here modules 10 and 11 are indicated as belonging to a navigation processing module 12 which receiving such pseudo-range measurements, previously calculated by said GNSS receiver, in particular by module 6, calculate the position velocity time PVT of the receiver. Such pseudo-range measurements $$\rho_i^1, \rho_i^5$$

may pertain a first carrier signal and a second carrier signal, in particular L1 and L5. The method here described in variant embodiments may be used with any GNSS band combination. For example it can be used processing signals from L1 and L2 bands. It is noted that the navigation processing operation may be in general defined in more general schematic as the operation following the tracking channels in module 5, and may include sometimes also the pseudo-range measurements calculation. In the present description, as mentioned is considered as an operation receiving the pseudo-range measurements as input and calculating the position velocity time PVT as output, i.e., it may correspond only to the user module 11 and related operations or it may include additional operations.

As mentioned, the tracking module 5 includes a plurality of channels, i.e., tracking correlation blocks which are usually let working in parallel each tuned on a different satellite PRN code and frequency, among the ones previously identified by the acquisition block 4, with the goal to confirm or eventually discard the acquisition hypothesis for every of them. For the confirmed satellites, after a startup refinement of the code and frequency initially provided by the acquisition block, the stable locked tracking phase starts. It consists into tightly following both the frequency offset (velocity) and the code phase (distance) of the satellite vehicle being analyzed and to demodulate the position and time information embedded in its bit stream. This information is then provided for instance to a Kalman Filter to triangulate the receiver position, e.g., in block 14.

The tracking channel as mentioned includes a correlator which includes a PRN (Pseudo Random Noise) delayed sequence generator. The GNSS signals received at the receiver includes a ranging code modulated into the carrier, also called Pseudo-Random Noise (PRN) code, which spreads the spectrum and allows retrieving ranging information. Therefore, it is beneficial that the tracking channel include a PRN delayed sequence generator, which generates PRN sequences which are early, punctual or delayed one with respect to the other to perform correlation with the ranging codes.

The solution here described in brief refers to a method for performing a correction of an ionospheric error affecting pseudo-range measurements in a GNSS receiver receiving satellite, e.g., $S_0$, . . . , $S_{NS-1}$ from one or more satellites $S_0$-$S_{NS-1}$, including in a navigation processing procedure, such as 12, performed at a GNSS receiver, receiving pseudo-range measurements previously calculated by said GNSS receiver pertaining to a first carrier signal and a second carrier signal, in particular L1 and L5, applying to said pseudo-range measurements corrections for predictable errors obtaining corrected pseudo-ranges and applying to said corrected pseudo-ranges an ionospheric error correction to obtain ionospheric error corrections of the pseudo-range measurements. The method includes performing a position calculation processing said corrected pseudo-range measurements and said ionospheric error corrections of the pseudo-range measurements and outputting position, velocity and time of the GNSS receivers. Performing a correction of an ionospheric error performing a correction of an ionospheric error includes evaluating if performing an ionospheric free linear combination on said pseudo-range measurements and supplying ionospheric free linear combination pseudo-range measurements to said position calculation operation only, otherwise performing a standard ionospheric error correction derived from GNSS navigation data, in particular by Klobuchar/Nequick models and/or SB AS, supplying the correspondingly standard ionospheric corrected pseudo-range measurements to said position calculation operation, said evaluating if performing an ionospheric free linear combination ionospheric error correction including evaluating a solar activity and performing said ionospheric free linear combination if the solar activity is above a given threshold.

Thus, the solution here described identifies if it is convenient performing the IFLC obtaining sufficiently accurate measurements with zero ionospheric error correction, or it is preferable to use an ionospheric error correction with another standard method, e.g., Klobuchar/Nequick models and/or SBAS.

Solar activity detection is used as the main enabling criteria, which can be however accompanied by other enabling criteria, cascaded, such as latitude detection, day detection, urban environment detection.

Figures 2A, 2B:
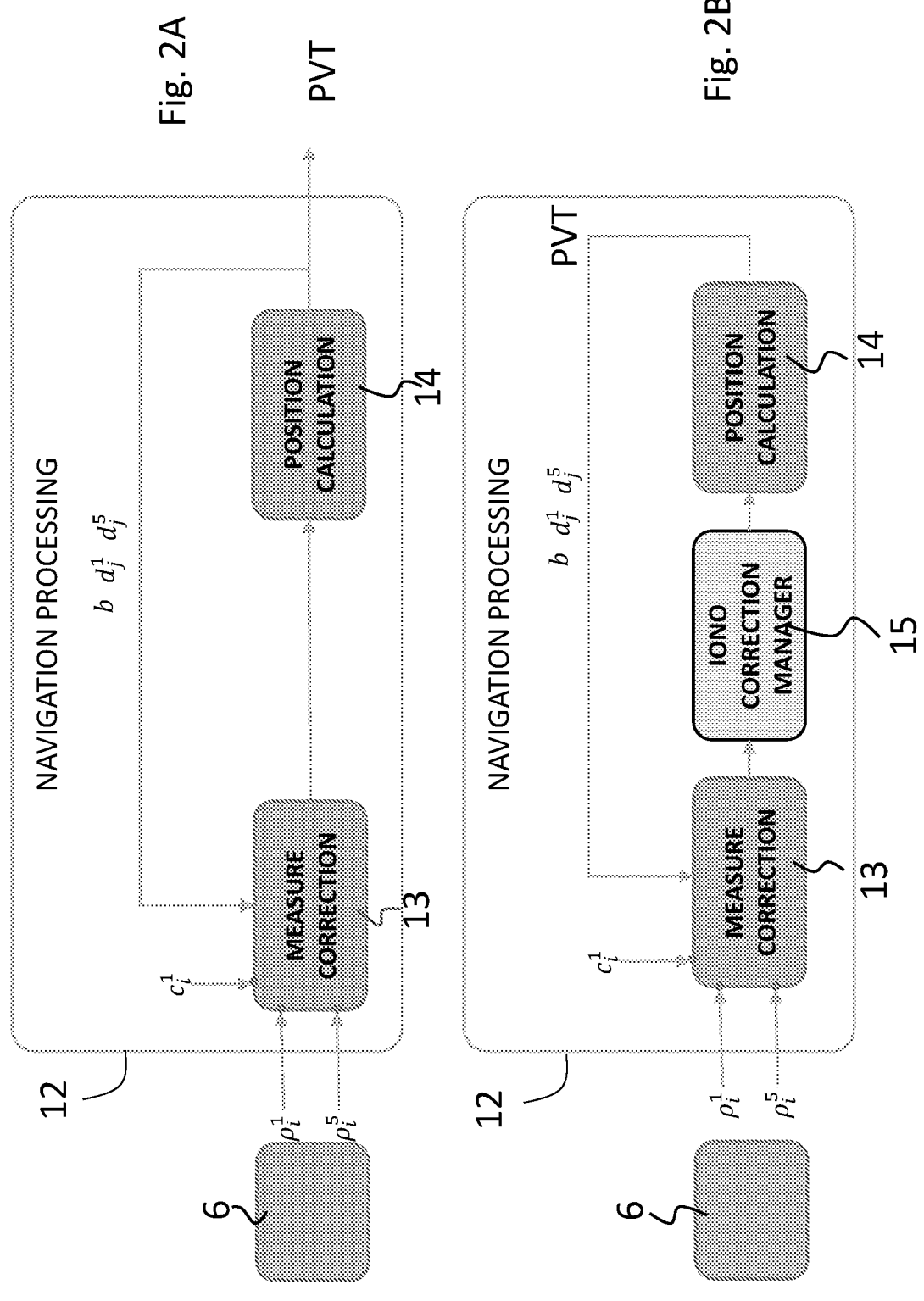
FIGS. 2A and 2B are a schematic representation of block in the receiver of FIG. 1 implementing operations the solution here described.

With reference to FIG. 2A, the navigation processing module 12, receiving the raw pseudo-range measurement $$\rho_i^1$$

from L1 carrier signal for the $i^{th}$ satellite and a raw pseudo-range measurement from L5 carrier signal for $i^{th}$ satellite $$\rho_i^5$$

from block 6, and in general from the GNSS digital signal processing, is here schematized including a measurement correction block 13 and a position calculation block 14. They may be, for instance, both in the user position block 11.

The measurement correction block 13 as said implements an operation receiving pseudo-range measurements $$\rho_i^1, \rho_i^5$$

from the GNSS Digital Signal Processing algorithms, in particular from the pseudo-range measurement calculation in block 6, and applying to them corrections $$c_i^1$$

for predictable errors. Such corrections $$c_i^1$$

may be provided by GNSS service operators and downloaded by the satellite signals.

Then, the position calculation block 14 implements an operation taking as input the corrected pseudo-range measurements outputted by block 13, combining them in order to solve the GNSS positioning and time estimation problem, as per equations defined in literature. The most classic and simple method to do this is through a least square regression approach; other embodiments may use different state estimation techniques, such, as mentioned above, as Extended Kalman Filters (EKF), or also Particle Filters The block 14 calculating the position, velocity, time estimation PVT feeds back some quantities to the correction block 13, i.e., a receiver clock bias b (estimated runtime by position calculation algorithm), a correction $$d_j^1$$

for receiver band 1 RF delay, a correction for receiver band 5 RF delay $$d_j^5.$$

In FIG. 2A it is shown a known arrangement of the navigation processing operation 12, while in FIG. 2B it is schematized an arrangement according to the solution here described, which provides an ionospheric error correction management operation 15, after the operation of the correction block 13, which evaluates which quantities are fed to the position calculation block 14.

Figure 3:
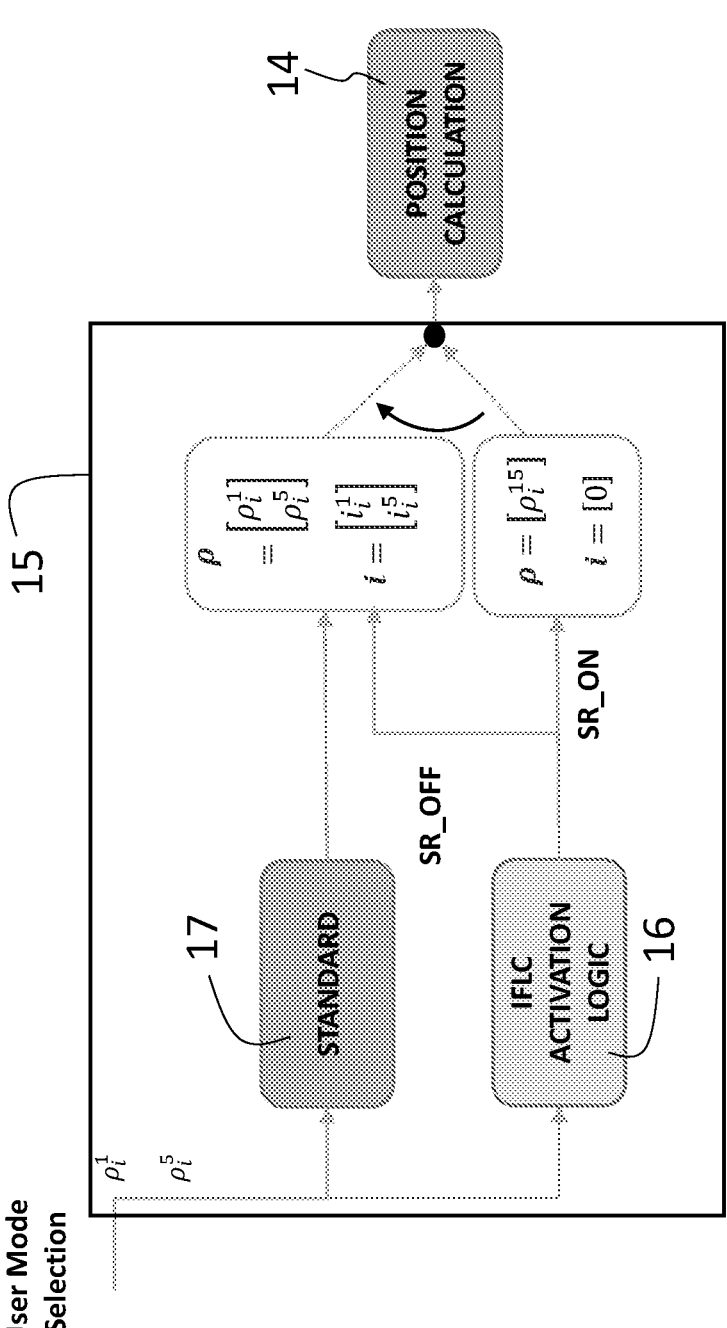
FIG. 3 is a schematic of a block representing operations of the method here described.

In FIG. 3 it is shown in more detail the ionospheric error correction management operation 15 including a standard ionospheric error correction operation 17 receiving the pseudo-range measurements $$\rho_i^1, \rho_i^5,$$

after correction for predictable errors in the correction block 13, and outputting a vector including such pseudo-range measurements $$\rho_i^1, \rho_i^5$$

along with respective ionospheric error corrections $$i_i^1, i_i^5,$$

which, as explained above, are obtained by standard methods, e.g., Klobuchar and or SBAS, from the corrections provided by GNSS service operators and downloaded by the satellite signals. The ionospheric error correction management operation 15 includes also a IFLC Activation Logic 16, which aims to decide which input data is to be used to feed position calculation algorithm in block 14, the data from standard operation 17 or data from the IFLC Activation Logic 16, according to a given criterion, evaluating if the IFLC improves the accuracy of the measurement of the position velocity time PVT information, i.e., if such ionospheric conditions occur, e.g., a solar storm is occurring, in correctly measurable conditions, such as, for instance, latitude, night time and open sky, as better explained in the following.

It the IFLC Activation Logic 16 determines that such ionospheric conditions occur, in particular correctly measurable, a solar correction condition active is declared this condition being indicated with SR_ON, an IFLC, or ionospheric free, pseudo-range $$\rho_i^{15}$$

according to the IFLC operation, using the two carriers, is calculated as $$\rho_i^{15} = \frac{1}{f_1^2 - f_5^2}(f_1^2 \rho_i^1 - f_5^2 \rho_i^5)$$

where $f_1$ is the GPS L1 carrier frequency at 1575.42 MHz and $f_5$ is the GPS L5 carrier frequency at 1176.45 MHz. The ionospheric error correction vector I supplied to the position calculation 14 is zero. Of course, depending on the choice of the first carrier and second carrier, the pseudo-range according to the IFLC operation may be different. e.g.:

$$\rho_i^{12} = \frac{1}{f_1^2 - f_2^2}(f_1^2 \rho_i^1 - f_2^2 \rho_i^2)$$

ff bands L1 and L2 are chosen.

If the IFLC Activation Logic 16 determines that such ionospheric conditions do not occur, in particular in correctly measurable conditions, a solar correction condition active SR_ON is detected and signaled, the standard pseudo-range measurements $$\rho_i^1, \rho_i^5$$

along with respective ionospheric error corrections $$i_i^1, i_i^5,$$

derived from GNSS navigation data (either through Klobuchar model or SBAS, if available) are supplied to the position calculation 14.

Figure 4:
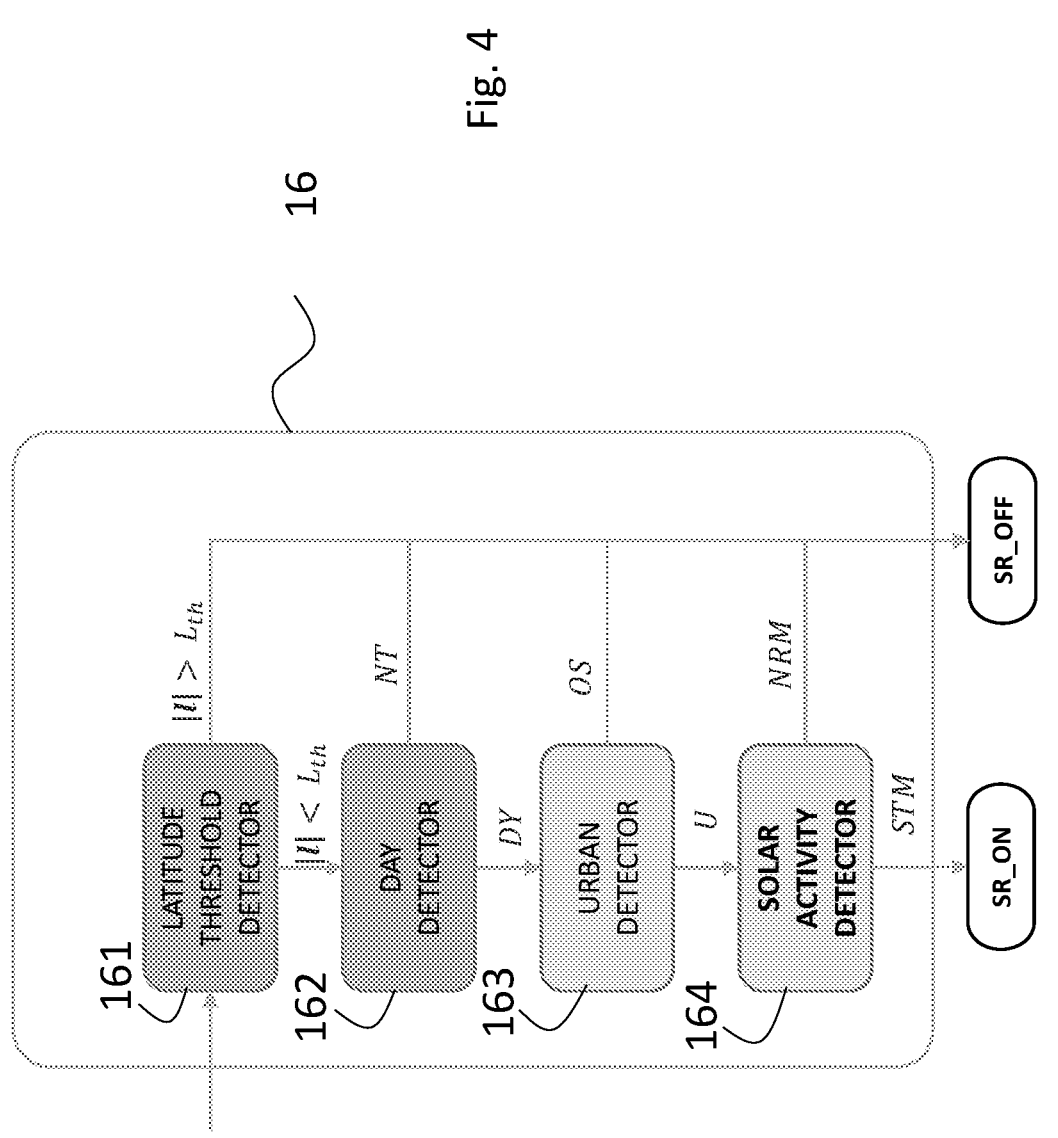
FIG. 4 is a schematics of detection operations performed by the block of FIG. 3.

FIG. 4 shows a block schematic representing an embodiment of the IFLC Activation Logic 16. Such IFLC Activation Logic in embodiments may perform a sequence of cascaded check operations that—if all passed—lead to declaration of solar risk correction active, i.e., condition SR_ON and consequently use of the of IFLC measurements, $$\rho_i^{15}$$

and ionospheric error correction i equal to zero.

Thus in the embodiment shown the IFLC Activation Logic 16 performs first a latitude threshold detection 161. Since the effects of strong solar activity are visible especially at low latitude, the latitude threshold detection 161 checks if the receiver is in such condition. A latitude threshold may be set in a configurable manner, thus the check is to check if $|l| > L_{th}$, where $|l|$ is the latitude measured and $L_{th}$ the configuration The information regarding latitude l is obtainable from the current position information obtained by the receiver. The receiver may calculate the latitude l by processing satellite signals. The solar activity is higher for lower latitudes, thus:

if the check $|l| < L_{th}$ gives a negative result, a solar correction condition inactive SR_OFF is detected and signaled;

if the check $|l| < L_{th}$ gives a positive result, a subsequent day detection 162 operation is performed.

The effects of the solar activity are only present during daytime. Thus, the day condition is checked based on current user position and UTC time. This is an operation known per se. The check performed in the example is if the day condition is day DY.

If the operation 162 gives a negative result, i.e., the day condition is night NT, a solar correction condition inactive SR_OFF is detected and signaled.

If the operation 162 gives a positive result, day DY, a subsequent urban environment detection 163 operation is performed. Due to measurements errors caused by reflections, which are higher order, when the receiver, for instance on a vehicle, is in dense urban environment it is not convenient to activate a solar activity detection 164, as described below, and to use IFLC measurements. The urban environment detection 163 operation is detailed in the following with reference to FIG. 5.

If the operation 163 gives a negative result, urban UY, a solar correction condition inactive SR_OFF is detected and signaled.

If the operation 163 gives a positive result, i.e., the condition is open sky OS, a subsequent solar activity detection 164 operation is performed.

The solar activity detection 164 operation includes comparing downloaded (standard) ionospheric error corrections $c_i$ to the ones calculated by mean of dual frequency technique, this block identifies solar anomalies, as better detailed in the following with reference to FIGS. 6A and 6B.

If the operation 164 gives a negative result, i.e., the solar condition is normal NRM, the solar correction condition inactive SR_OFF is detected and signaled.

If the operation 164 gives a positive result, i.e., solar activity is detected STM, the solar correction condition inactive SR_OFF is detected and signaled.

It is pointed out that in different embodiments the method may include only the operation 164 of solar detection, for instance letting to the user to evaluate if conditions for solar detection occur, or only one or more of the operations 161, 162, 163, which represent operations of checking conditions which allows the solar detection operation 164 to operate correctly. Also, only one or more of the operations 161, 162, 163 may be performed, and in a different sequence with respect to that described with respect to FIG. 4. Also it would be possible for user to connect the device to a host which has access to ionospheric databases for instance in a research institute, although generally this option is not adopted in the automotive field for cost reasons.

Thus, the solution here described refers in general to a method for performing a correction of an ionospheric error affecting pseudo-range measurements in a GNSS receiver 100 receiving a plurality of satellite signals $S_0, \ldots, S_{NS-1}$ from a plurality of satellites $S_0$-$S_{NS-1}$ of the constellation of satellites, including in a navigation processing procedure performed at a GNSS receiver, e.g., 100, receiving pseudo-range measurements, e.g., $$\rho_i^1, \rho_i^5$$

previously calculated by said GNSS receiver 100 obtained from a first carrier signal, e.g., L1, and a second carrier signal, e.g., L5, in said satellite signals $S_0, \ldots, S_{NS-1}$, in particular as said in GPS bands L1 and L5, performing a correction procedure of said pseudo-range measurements $$\rho_i^1, \rho_i^5$$

including applying, e.g., by block 13, to said pseudo-range measurements $$\rho_i^1, \rho_i^5; \rho_i^{15}$$

corrections for predictable errors $$c_i^1$$

obtaining corrected pseudo-ranges $$\rho_i^1, \rho_i^5$$

and applying, e.g., by block 15, to said corrected pseudo-range measurements, such as $$\rho_i^1, \rho_i^5; \rho_i^{15},$$

a further ionospheric error correction calculation to obtain further ionospheric error correction values, such as $$i_i^1, i_i^5; i.$$

The method includes performing a position calculation operation, e.g., by blocks 11, 14, processing said corrected pseudo-range measurements, $$\rho_i^1, \rho_i^5; \rho_i^{15},$$

and said ionospheric error corrections values $$i_i^1, i_i^5; i$$

and outputting position, velocity and time information PVT of the GNSS receiver 100. Said applying 15 to said corrected pseudo-ranges $$\rho_i^1, \rho_i^5$$

a further ionospheric error correction calculation to obtain further ionospheric error correction values $$i_i^1, i_i^5,$$

including performing one or more checking operations, e.g., 161, 162, 163, 164, enabling, SR_ON, performing, e.g., by block 16, a ionosphere free linear combination on said pseudo-range measurements $$\rho_i^1, \rho_i^5$$

obtaining ionospheric free linear combination pseudo-range measurements $$\rho_i^{15}$$

and supplying it to said position calculation, 11, 14, operation only, otherwise performing, e.g., by block 17, a standard ionospheric error correction $$i_i^b$$

derived from GNSS navigation data, in particular by Klobuchar/Nequick models and/or SB AS, supplying the correspondingly standard ionospheric corrected pseudo-range measurements $$\rho_i^1, \rho_i^5$$

to said position calculation operation 11, 14, said performing one or more checking operations 161, 162, 163, 164 including evaluating 164 a solar activity $I_r$ and enabling, SR_ON, performing said ionospheric free linear combination if the solar activity $I_r$ is above a given threshold.

15 16

Then, in an embodiment, performing one or more checking operations 161, 162, 163, 164 further includes performing, prior to such evaluating 164 a solar activity, e.g., $I_t$, one or more operations, which are for instance 161, 162, 163, checking if the receiver 100 is in condition to correctly measure said solar activity. As said otherwise a manual checking by the user may be possible.

Also such one or more operations, e.g., 161, 162, 163, checking if the GNSS receiver 100 may include one or more or of the operations: checking 161 if the latitude is below a latitude threshold, checking 162 if a day condition is occurring, checking 163 if the GNSS receiver 100 is in an urban environment, evaluating 164 a solar activity, e.g., $I_t$, and enabling SR_ON performing said ionospheric free linear combination if the solar activity $I_t$ is above a given threshold, each of said operations 161, 162, 163 enabling the execution of the following operation 162, 163, 164 in the sequence.

Otherwise the checking operations 161, 162, 163 may be in a different order or less in number, provided that solar activity detection 164 is finally performed.

Figure 5:
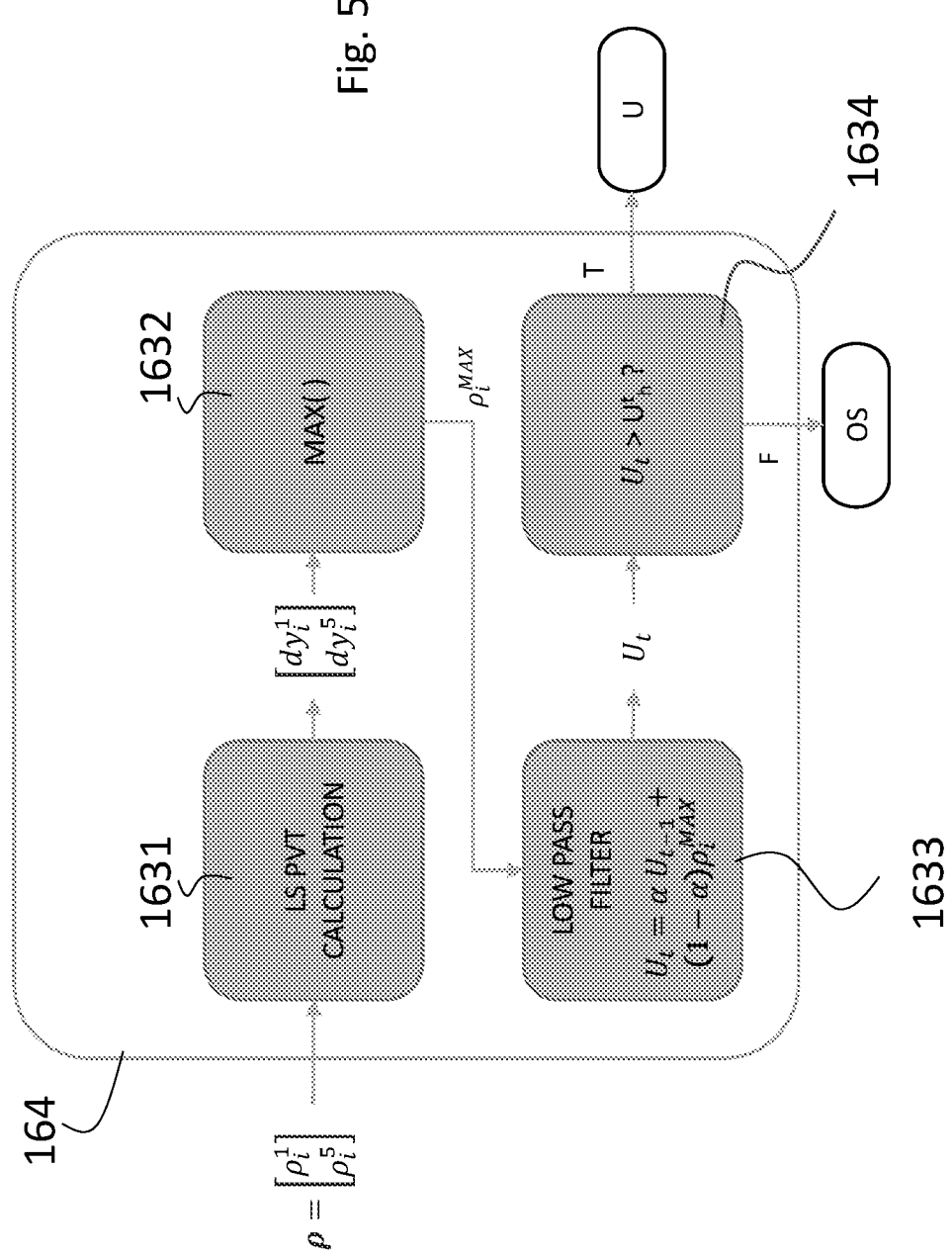
FIG. 5 is a detailed schematic of a detection operation performed by the block shown in FIG. 3.

With reference to FIG. 5, a block schematic shows detailing of the urban environment detection operation 163. The urban environment detection operation 163 allows to understand if vehicle is crossing urban environments, where the application of IFLC is not convenient, i.e., the solar correction condition inactive SR_OFF is detected and signaled in block 16 leading to use of the standard pseudo-range measurements $$\rho_i^1, \rho_i^5$$

along with respective ionospheric error corrections $$i_i^1, i_i^5,$$

derived from GNSS navigation data (either through Klobuchar model or SBAS, if available), which are supplied to the position calculation 14.

In the block 163 the standard pseudo-range measurements $$\rho_i^1, \rho_i^5$$

are input to a least square regression operation 1631 to calculate raw user position from pseudo-ranges data. This operation is known per se a way to obtain PVT from the pseudo-ranges.

In this case, rather than the position, the output of block 163 is a residual error $$\begin{bmatrix} dy_i^1 \\ dy_i^5 \end{bmatrix}$$

of the least square calculation, $$dy_i^1$$

being the residual error for the i-th satellite and the first carrier L1 and $dy_i^5$ being the residual error for the i-th satellite and the second carrier L5. Such residual error $$\begin{bmatrix} dy_i^1 \\ dy_i^5 \end{bmatrix}$$

is in general very low if all the pseudo-ranges from different satellites are consistent (which typically happens in open sky conditions) while increases sensibly when one or more data suffer biases from reflections by the surrounding buildings.

To increase indicator robustness and resiliency to false alarm rate an operation 1632, picking a maximum residual error value $$\rho_i^{MAX}$$

in the residual error $$\begin{bmatrix} dy_i^1 \\ dy_i^5 \end{bmatrix},$$

is performed and then a low pass filtering 1633 to decrease measurements' time correlation is performed, for instance applying $$U_t = \alpha U_{t-1} + (1 - \alpha)\rho_i^{MAX}$$

where $U_t$ is the filtered urban indicator at time t and $\alpha$ a settable filtering constant.

The filtered urban indicator $U_t$ is then compared in an operation 1634 to a respective threshold $U_{TH}$ and if greater the urban condition U is detected and signaled, otherwise the open sky condition OS is detected and signaled.

Figure 6A:
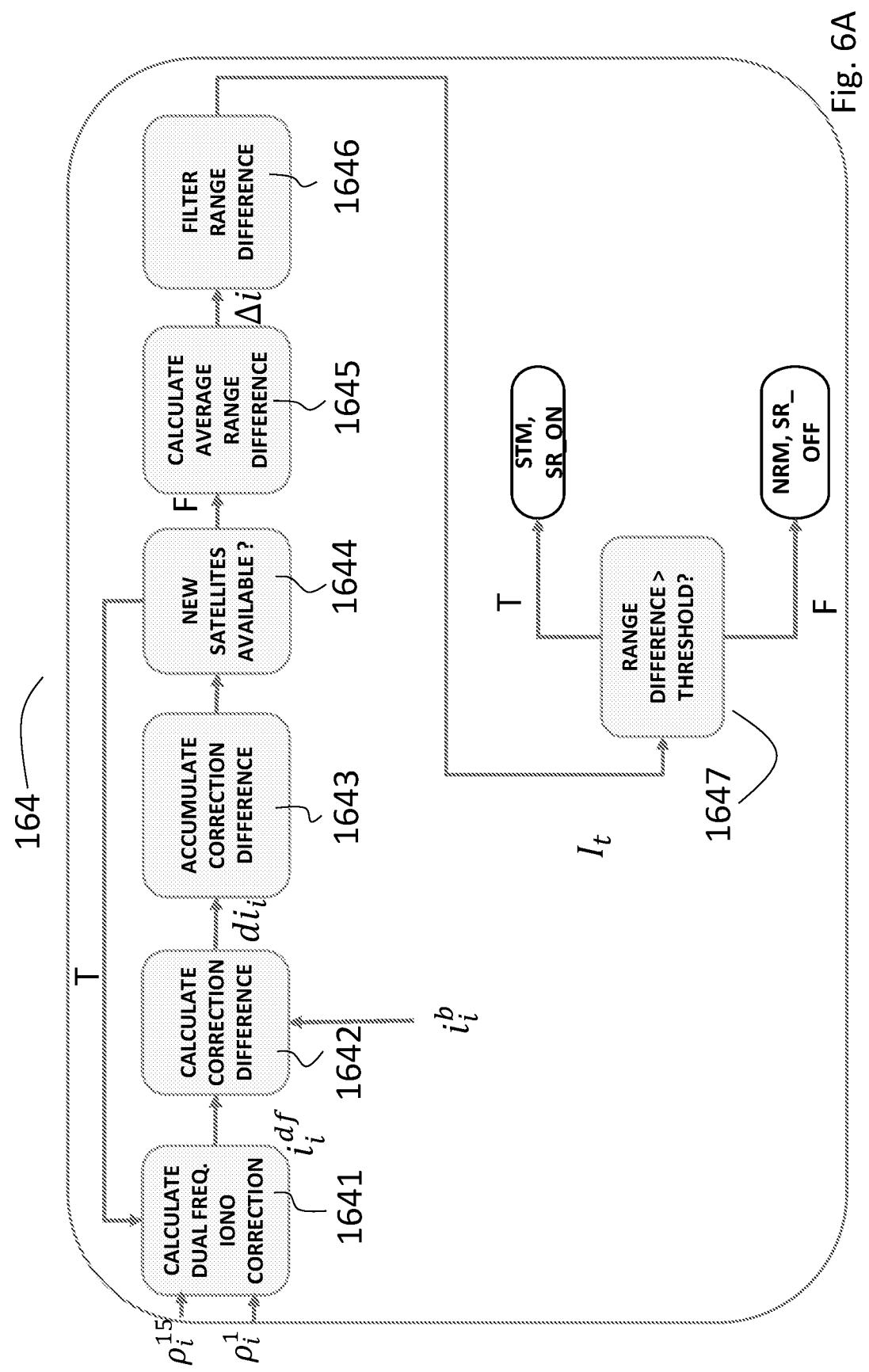
FIGS. 6A and 6B show detailed schematics representing a further detection operation performed by the block shown in FIG. 3.

In FIG. 6A it is shown a schematic of the solar detection operation 164. FIG. 6B is further detailing some of the steps shown in FIG. 6A.

The basic empiric rational on which it is based is that, in an open sky environment, if the solar activity follows expectations the ionospheric error correction broadcasted by GNSS satellites should be like the one calculated from dual frequency satellite information.

Thus the solar detection operation 164 receives as inputs the iono-affected pseudo-range $$\rho_i^1$$

and the ionospheric free one $$\rho_i^{15}$$

first calculating in a step 1641 the dual frequency estimated ionospheric error correction for the i-th satellite $$i_i^{df},$$

which is the difference (difference block 1641a in FIG. 6B) between the raw iono-affected pseudo-range $$\rho_i^1$$

and the ionospheric free pseudo-range $$\rho_i^{15}.$$

Figure 6B:
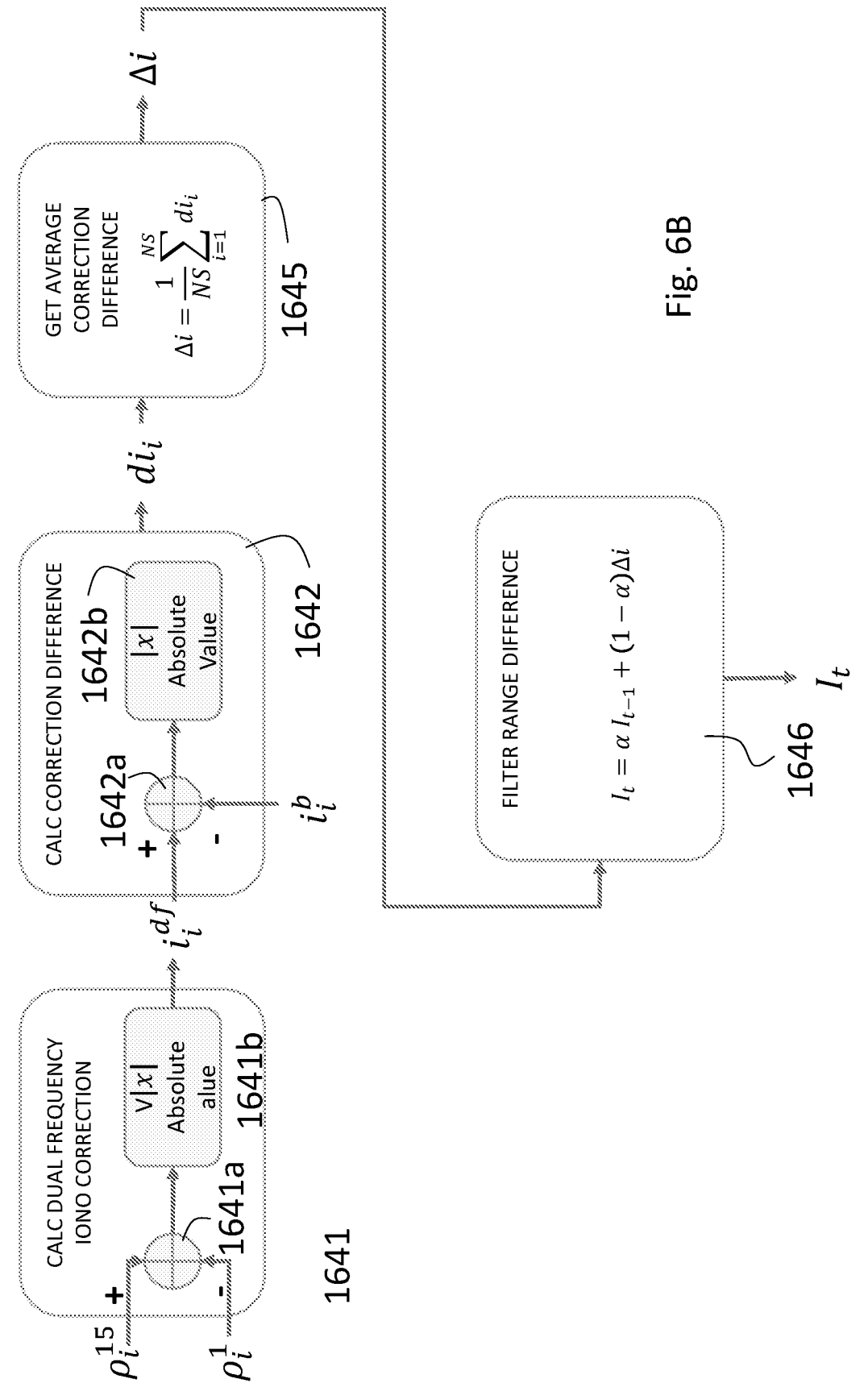

As detailed in FIG. 6B an absolute value of such difference is calculated (block 1641b) as dual frequency estimated ionospheric error correction for the i-th satellite $$i_i^{df}.$$

Then a calculation 1642 of the correction difference, as the correction difference $di_i$ (difference block 1642b in FIG. 6B) of the dual frequency estimated ionospheric error correction for the i-th satellite $$i_i^{df}$$

with respect to a broadcasted correction $$i_i^b$$

(from Klobuchar or SBAS models). As detailed in FIG. 6B also here an absolute value of such difference is calculated (block 1642b) as absolute value.

Such correction difference $di_i$ is accumulated in a step 1643 over the whole constellations of NS satellites $S_0$-$S_{NS-1}$ in view, and finally averaged in a step 1645, yielding a delta ionospheric error metric $\Delta i$, or range difference, for the current measurement epoch. Between the accumulation step 1643 and the averaging step 1645 a check if new satellites are available in the constellation is performed. In the affirmative, it is returned to step 1641 to recalculate the correction difference $di_i$ with the new satellite constellations. Otherwise the averaging step 1645 is performed.

The averaging step as detailed in FIG. 6B implements the equation:

$$\Delta i = \frac{1}{NS} \sum_{i=1}^{NS} di_i$$

The delta ionospheric error metric $\Delta i$ is heavily affected by the high noise on IFLC pseudo-ranges $$\rho_i^{15};$$

hence a low pass filter stage 1646 (e.g., IIR filter) follows in order to smooth out such delta ionospheric error metric $\Delta i$ and make it consistent on a minute's time landscape. Different type of low pass filtering may be used, alternative to IIR, among them FIR, Kalman Filter, Complementary filter, moving average.

In particular, as shown in FIG. 6B, it is computed an ionospheric metric indicator $I_t$ by filtering 1646 according to the recursive relation:

$$I_t = \alpha I_{t-1} + (1-\alpha)\Delta i$$

where $I_t$ is the filtered metric I at the time t, and $\alpha$ the coefficient of the IIR filter used in the example for filtering.

If such ionospheric metric indicator $I_t$ falls above a given threshold, as checked in a checking block 1647. Defined using practical case the solar storm state, or solar activity state, STM is declared, the solar correction condition active SR_ON is detected and signaled, and usage of IFLC pseudo-ranges in block 14 to calculate the position PVT is performed. Otherwise, the normal state NRM is detected and signaled, i.e., the solar correction condition inactive SR_ON is detected and signaled, and the standard pseudo-range measurements $$\rho_i^1, \rho_i^5$$

along with respective ionospheric error corrections $$i_i^1, i_i^5,$$

derived from GNSS navigation data (either through Klobuchar model or SBAS, if available), are supplied to the position calculation 14.

AS mentioned in embodiments, modules 6-11 of the GNSS receiver 100 can be implemented by software. Also navigation processing 12 as a whole, and in particular any or all of modules 13, 14, 15, 16, 17 can be implemented by software in the receiver 100.

The solutions disclosed herein have thus significant advantages with respect to the known solutions.

Advantageously the solution here described represents a compensation approach for the position error caused by ionosphere approach which is independent from user location. In particular, SBAS systems may implement a geostationary grid over certain areas. If a user is located in the middle of the grid, SBAS iono error reduction is effective. However, when a user is located at the side of the grid, SBAS effectiveness may decrease substantially. Embodiments of the present disclosure instead provide iono error cancellation in a manner totally independent from user placement.

The solution here described represents a compensation which is also real time, and hence can cope with sudden or unpredicted solar activity behavior that could not be managed by standard compensation approaches (Klobuchar, SBAS)

The solution here described represents a compensation approach which adaptively and seamlessly turns on and off depending on reception condition. Compared to prior solutions, it can exploit IFLC only when called for, avoiding to inject additional noise on solution or reduce measurement availability under benign solar condition or when user is located in a dense urban environment (where solar effects become less relevant compared to other environmental error factors like multipath).

Of course, without prejudice to the principles of the present disclosure, the details of construction and the embodiments may vary widely with respect to what has been described and illustrated herein purely by way of example, without thereby departing from the scope of the present disclosure as defined by the ensuing claims.

Method for performing a correction of a ionospheric error affecting pseudo-range measurements in a GNSS receiver ($100$) receiving a plurality of satellite signals ($S_0, \ldots, S_{NS-1}$) from a plurality of satellites ($S_0$-$S_{NS-1}$) of the constellation of satellites, may be summarized as including in a navigation processing procedure performed at a GNSS receiver ($100$), receiving pseudo-range measurements $$(\rho_i^1, \rho_i^5)$$

previously calculated by said GNSS receiver ($100$) obtained from a first carrier signal (L1) and a second carrier signal (L5) in said satellite signals ($S_0, \ldots, S_{NS-1}$), in particular in GPS bands L1 and L5, performing a correction procedure of said pseudo-range measurements $$(\rho_i^1, \rho_i^5)$$

including compensating ($13$) said pseudo-range measurements $$(\rho_i^1, \rho_i^5; \rho_i^{15})$$

for predictable errors $$(c_i^1)$$

obtaining corrected pseudo-ranges $$(\rho_i^1, \rho_i^5)$$

and applying ($15$) to said corrected pseudo-range measurements $$(\rho_i^1, \rho_i^5; \rho_i^{15})$$

20 a further calculation to obtain further ionospheric error correction values $$(i_i^1, i_i^5; i),$$

performing a position calculation operation ($11$, $14$) processing said corrected pseudo-range measurements $$(\rho_i^1, \rho_i^5; \rho_i^{15})$$

and said ionospheric error correction values $$(i_i^1, i_i^5; i)$$

and outputting position, velocity and time information (PVT) of the GNSS receiver ($100$), wherein said applying ($15$) to said corrected pseudo-ranges $$(\rho_i^1, \rho_i^5)$$

a further ionospheric error correction calculation to obtain further ionospheric error correction values $$(i_i^1, i_i^5),$$

including performing one or more checking operations ($161$, $162$, $163$, $164$) enabling (SR_ON) performing ($16$) a ionosphere free linear combination on said pseudo-range measurements $$(\rho_i^1, \rho_i^5)$$

obtaining ionospheric free linear combination pseudo-range measurements $$(\rho_i^{15})$$

and supplying it to said position calculation ($11$, $14$) operation only, otherwise performing ($17$) a standard ionospheric error correction $$(i_i^b)$$

derived from GNSS navigation data, in particular by Klobuchar/Nequick models and/or SBAS, supplying the correspondingly standard ionospheric corrected pseudo-range measurements $$(\rho_i^1, \rho_i^5)$$

to said position calculation operation (11, 14), said performing one or more checking operations (161, 162, 163, 164) including evaluating (164) a solar activity ($I_r$) and enabling (SR_ON) performing said ionospheric free linear combination if the solar activity ($I_r$) is above a given threshold.

Said performing one or more checking operations (161, 162, 163, 164) may further include performing, prior to said evaluating (164) a solar activity ($I_r$) one or more operations (161, 162, 163) checking if the receiver (100) is in condition to correctly measure said solar activity.

Said one or more operations (161, 162, 163) may check if the receiver (100) is in condition to correctly measure said solar activity, may include one or more of: checking (161) if the latitude is below a latitude threshold, may check (162) if a day condition is occurring, and may check (163) if the GNSS receiver (100) is in an urban environment.

Said performing one or more checking operations (161, 162, 163, 164) may include a sequence of the operations: checking (161) if the latitude is below a latitude threshold, checking (162) if a day condition is occurring, checking (163) if the GNSS receiver (100) is in an urban environment, evaluating (164) a solar activity ($I_r$) and enabling (SR_ON) performing said ionospheric free linear combination if the solar activity ($I_r$) is above a given threshold, each of said operations (161, 162, 163) enabling the execution of the following operation (162, 163, 164) in the sequence.

Said evaluating (164) a solar activity ($I_r$) and enabling (SR_ON) performing said ionospheric free linear combination if the solar activity ($I_r$) may be above a given threshold includes receiving a as input the pseudo-range $$\left( \rho_i^1 \right)$$

from the first carrier or second carrier and the ionospheric free linear combination pseudo-range measurements $$\left( \rho_i^{15} \right)$$

calculating (1641) a dual frequency estimated ionospheric error correction for a given (i-th) satellite $$\left( i_i^{df} \right)$$

as the difference (1641*a***) between the pseudo-range $$\left( \rho_i^1 \right)$$

from the first carrier or second carrier and the ionospheric free linear combination pseudo-range measurements $$\left( \rho_i^{15} \right),$$

calculating (1642) of a correction difference $di_i$ as the difference (1642*b***) of the dual frequency estimated ionospheric error correction for the i-th satellite $$\left( i_i^{df} \right)$$

with respect to a broadcasted correction $$\left( i_i^{b} \right),$$

calculated as standard ionospheric error correction (17) derived from GNSS navigation data, in particular by Klobuchar/Nequick models and/or SBAS, accumulating 1643 said correction difference ($di_i$) over the whole constellation of (NS) satellites $S_0$-$S_{NS-1}$ in view and averaging (1645) over the number (NS) of satellites $S_0$-$S_{NS-1}$ in view, yielding a delta ionospheric error metric ($\Delta i$), in particular between said accumulation step (1643) and averaging step (1645) checking (1644) check if new satellites are available, in the affirmative returning to the step of calculating (1641) a dual frequency estimated ionospheric error correction, otherwise performing the averaging step (1645), low pass filtering (1646), in particular by a IIR filter, said delta ionospheric error metric ($\Delta i$) obtaining an ionospheric metric solar activity indicator ($I_r$), and checking (1647) if said ionospheric metric solar activity indicator ($I_r$) falls above a given threshold ($I_{TH}$), in the affirmative enabling (SR_ON) performing (16) a ionosphere free linear combination on said pseudo-range measurements $$\left( \rho_i^1, \ \rho_i^5 \right)$$

obtaining ionospheric free linear combination pseudo-range measurements $$\left( \rho_i^{15} \right)$$

and supplying it to said position calculation (11, 14) operation only.

Said checking (163) if the GNSS receiver (100) may be in an urban environment includes inputting the standard pseudo-range measurements $$\left( \rho_i^1, \ \rho_i^5 \right)$$

to a least square regression operation (1631) to calculate raw user position data from pseudo-ranges data, supplying residual errors $$\left( \begin{bmatrix} dy_i^1 \\ dy_i^5 \end{bmatrix} \right)$$

for each pseudo-range measurement derived from said least square calculation (1631), picking (1632) the maximum error value $$\left(\rho_i^{MAX}\right)$$

among such residual errors $$\left[\begin{matrix} dy_i^1 \\ dy_i^5 \end{matrix}\right],$$

performing a low pass filtering (1633), in particular IIR filtering, on said maximum residual error value $$\left(\rho_i^{MAX}\right)$$

obtaining a urban environment indication value ($U_i$), checking (1634) if said urban environment indication value ($U_i$) is greater than a respective threshold ($U_{TH}$) in the affirmative detecting and signaling (U) that the receiver (100) is in an urban condition, otherwise an open sky condition (OS) is detected and signaled.

Receiver apparatus may be configured to perform the method.

Computer program product directly loadable into the internal memory of a digital computer, may be summarized as including software code portions for performing the steps of the method.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for performing a correction of an ionospheric error affecting pseudo-range measurements in a global navigation satellite system (GNSS) receiver receiving a plurality of satellite signals from a plurality of satellites of a constellation of satellites, comprising, in a navigation processing procedure performed at a GNSS receiver:

receiving pseudo-range measurements previously calculated by the GNSS receiver obtained from a first carrier signal and a second carrier signal in the satellite signals in global positioning system (GPS) bands L1 and L5;

performing a correction procedure of the pseudo-range measurements including:

compensating the pseudo-range measurements for predictable errors obtaining corrected pseudo-ranges; and applying to the corrected pseudo-range measurements a further calculation to obtain further ionospheric error correction values;

performing a position calculation operation processing the corrected pseudo-range measurements and the ionospheric error correction values and outputting position, velocity and time information of the GNSS receiver;

wherein the applying to the corrected pseudo-ranges a further ionospheric error correction calculation to obtain further ionospheric error correction values includes:

performing one or more checking operations enabling performing an ionosphere free linear combination on the pseudo-range measurements obtaining ionospheric free linear combination pseudo-range measurements and supplying the ionospheric free linear combination to the position calculation operation only;

otherwise performing a standard ionospheric error correction derived from GNSS navigation data by Klobuchar/Nequick models and/or satellite-based augmentation system (SBAS), supplying the correspondingly standard ionospheric corrected pseudo-range measurements to the position calculation operation; and the performing one or more checking operations including evaluating a solar activity and enabling performing the ionospheric free linear combination if the solar activity is above a given threshold;

the performing one or more checking operations includes checking if the GNSS receiver is in an urban environment including inputting the standard pseudo-range measurements to a least square regression operation to calculate raw user position data from pseudo-ranges data, supplying residual errors for each pseudo-range measurement derived from the least square calculation, picking the maximum error value among such residual errors, performing a low pass filtering, in particular infinite impulse response filtering, on the maximum residual error value obtaining a urban environment indication value checking if the urban environment indication value is greater than a respective threshold in the affirmative detecting and signaling that the receiver is in an urban condition, otherwise an open sky condition is detected and signaled.

2. The method according to claim 1, wherein the evaluating a solar activity and enabling performing the ionospheric free linear combination if the solar activity is above a given threshold includes:

receiving as input the pseudo-range from the first carrier or second carrier and the ionospheric free linear combination pseudo-range measurements;

calculating a dual frequency estimated ionospheric error correction for a given satellite as the difference between the pseudo-range from the first carrier or second carrier and the ionospheric free linear combination pseudo-range measurements;

calculating a correction difference as the difference of the dual frequency estimated ionospheric error correction for the i-th satellite with respect to a broadcasted correction, calculated as standard ionospheric error correction derived from GNSS navigation data by Klobuchar/Nequick models and/or SBAS;

accumulating the correction difference over the whole constellation of satellites $S_0$-$S_{NS-1}$ in view and averaging over the number of satellites in view, yielding a delta ionospheric error metric, in particular between the accumulation step and averaging step checking if new satellites are available, in the affirmative returning to the step of calculating a dual frequency estimated ionospheric error correction, otherwise performing the averaging step;

low pass filtering, by an infinite impulse response filter, the delta ionospheric error metric obtaining an ionospheric metric solar activity indicator; and checking if the ionospheric metric solar activity indicator falls above a given threshold, in the affirmative enabling performing an ionosphere free linear combination on the pseudo-range measurements obtaining ionospheric free linear combination pseudo-range measurements and supplying the ionospheric free linear combination pseudo-range measurements to the position calculation operation only.

3. The method according to claim 1, wherein the performing one or more checking operations further includes performing, prior to the evaluating a solar activity, one or more operations checking if the receiver is in condition to correctly measure the solar activity.

4. The method according to claim 3, wherein the one or more operations checking if the receiver is in condition to correctly measure the solar activity, include one or more of:

checking if the latitude is below a latitude threshold;

checking if a day condition is occurring; and checking if the GNSS receiver is in an urban environment.

5. The method according to claim 4, wherein the performing one or more checking operations includes a sequence of the operations:

checking if the latitude is below a latitude threshold;

checking if a day condition is occurring;

checking if the GNSS receiver is in an urban environment; and evaluating a solar activity and enabling performing the ionospheric free linear combination if the solar activity is above a given threshold, each of the operations enabling the execution of the following operation in the sequence.

6. A global navigation satellite system (GNSS) receiver, comprising:

one or more processors; and one or more memories configured to store software instructions, wherein the one or more processors are configured to execute the software instructions to perform a process for correcting an ionospheric error affecting pseudo-range measurements in the GNSS receiver receiving a plurality of satellite signals from a plurality of satellites of a constellation of satellites, the process including:

receiving pseudo-range measurements previously calculated by the GNSS receiver obtained from a first carrier signal and a second carrier signal in the satellite signals in GPS bands L1 and L5; and performing a correction procedure of the pseudo-range measurements including:

compensating the pseudo-range measurements for predictable errors obtaining corrected pseudo-ranges; and applying to the corrected pseudo-range measurements a further calculation to obtain further ionospheric error correction values;

performing a position calculation operation processing the corrected pseudo-range measurements and the ionospheric error correction values and outputting position, velocity and time information of the GNSS receiver; wherein applying to the corrected pseudo-ranges a further ionospheric error correction calculation to obtain further ionospheric error correction values includes:

performing one or more checking operations enabling performing an ionosphere free linear combination on the pseudo-range measurements obtaining ionospheric free linear combination pseudo-range measurements and supplying the ionospheric free linear combination to the position calculation operation only; and otherwise performing a standard ionospheric error correction derived from GNSS navigation data by Klobuchar/Nequick models and/or satellite-based augmentation system (SBAS), supplying the correspondingly standard ionospheric corrected pseudo-range measurements to the position calculation operation, wherein performing one or more checking operations includes evaluating a solar activity and enabling performing the ionospheric free linear combination if the solar activity is above a given threshold;

wherein the evaluating a solar activity and enabling performing the ionospheric free linear combination if the solar activity is above a given threshold includes:

receiving as input the pseudo-range from the first carrier or second carrier and the ionospheric free linear combination pseudo-range measurements;

calculating a dual frequency estimated ionospheric error correction for a given satellite as the difference between the pseudo-range from the first carrier or second carrier and the ionospheric free linear combination pseudo-range measurements; and calculating a correction difference as the difference of the dual frequency estimated ionospheric error correction for the i-th satellite with respect to a broadcasted correction, calculated as standard ionospheric error correction derived from GNSS navigation data by Klobuchar/Nequick models and/or SBAS.

7. The GNSS receiver of claim 6, wherein the evaluating a solar activity and enabling performing the ionospheric free linear combination if the solar activity is above a given threshold includes:

accumulating the correction difference over the whole constellation of satellites in view and averaging over the number of satellites in view, yielding a delta ionospheric error metric, in particular between the accumulation step and averaging step checking if new satellites are available, in the affirmative returning to the step of calculating a dual frequency estimated ionospheric error correction, otherwise performing the averaging step;

low pass filtering, by an infinite impulse response filter, the delta ionospheric error metric obtaining an ionospheric metric solar activity indicator; and checking if the ionospheric metric solar activity indicator falls above a given threshold, in the affirmative enabling performing an ionosphere free linear combination on the pseudo-range measurements obtaining ionospheric free linear combination pseudo-range measurements and supplying the ionospheric free linear combination pseudo-range measurements to the position calculation operation only.

8. The GNSS receiver of claim 6, wherein the checking if the GNSS receiver is in an urban environment includes inputting the standard pseudo-range measurements to a least square regression operation to calculate raw user position data from pseudo-ranges data, supplying residual errors for each pseudo-range measurement derived from the least square calculation, picking the maximum error value among such residual errors, performing a low pass filtering, in particular infinite impulse response filtering, on the maximum residual error value obtaining a urban environment indication value checking if the urban environment indication value is greater than a respective threshold in the affirmative detecting and signaling that the receiver is in an urban condition, otherwise an open sky condition is detected and signaled.

9. The GNSS receiver of claim 6, wherein performing one or more checking operations further includes performing, prior to the evaluating a solar activity, one or more operations checking if the receiver is in condition to correctly measure the solar activity.

10. The GNSS receiver of claim 9, wherein the one or more operations checking if the receiver is in condition to correctly measure the solar activity, include one or more of:
   checking if the latitude is below a latitude threshold;
   checking if a day condition is occurring; and
   checking if the GNSS receiver is in an urban environment.

11. The GNSS receiver of claim 10, wherein performing one or more checking operations includes a sequence of the operations:
   checking if the latitude is below a latitude threshold;
   checking if a day condition is occurring;
   checking if the GNSS receiver is in an urban environment; and
   evaluating a solar activity and enabling performing the ionospheric free linear combination if the solar activity is above a given threshold, each of the operations enabling the execution of the following operation in the sequence.

12. A method, comprising:
   receiving, at a global navigation satellite system (GNSS) receiver, pseudo-range measurements in a plurality of satellite signals from a plurality of satellites;
   generating corrected pseudo-range measurements by compensating for predictable errors in the pseudo-range measurements;
   generating ionospheric error correction values from the corrected pseudo-range measurements by generating ionospheric free linear combination pseudo-range measurements by performing an ionosphere free linear combination on the pseudo-range measurements; and
   performing a position calculation by processing the corrected pseudo-range measurements and the ionospheric error correction values; and
   outputting position, velocity and time information of the GNSS receiver based, at least in part, on the position calculation operation;
   applying to the corrected pseudo-range measurements a further ionospheric error correction calculation to obtain further ionospheric error correction values, including:
      performing one or more checking operations enabling performing an ionosphere free linear combination on the pseudo-range measurements obtaining ionospheric free linear combination pseudo-range measurements and supplying the ionospheric free linear combination to the position calculation operation only; and
      otherwise performing a standard ionospheric error correction derived from GNSS navigation data by Klobuchar/Nequick models and/or satellite-based augmentation system (SBAS), supplying the correspondingly standard ionospheric corrected pseudo-range measurements to the position calculation operation, wherein performing one or more checking operations includes evaluating a solar activity and enabling performing the ionospheric free linear combination if the solar activity is above a given threshold; and
      checking if the GNSS receiver is in an urban environment including inputting standard pseudo-range measurements to a least square regression operation to calculate raw user position data from pseudo-ranges data, supplying residual errors for each pseudo-range measurement derived from the least square calculation, picking the maximum error value among such residual errors, performing a low pass filtering, in particular infinite impulse response filtering, on the maximum residual error value obtaining a urban environment indication value, checking if the urban environment indication value is greater than a respective threshold in the affirmative detecting, and signaling that the receiver is in an urban condition, otherwise an open sky condition is detected and signaled.

13. The method of claim 12, comprising performing one or more checking operations to enable performing the ionosphere free linear combination on the pseudo-range measurements.

14. The method of claim 13, comprising utilizing the ionospheric free linear combination in the position calculation.

15. The method of claim 13, wherein the one or more checking operations includes evaluating a solar activity and enabling performing the ionospheric free linear combination if the solar activity is above a given threshold.

16. The method of claim 15, comprising:
   performing a standard ionospheric error correction derived from GNSS navigation data by Klobuchar/Nequick models and/or satellite-based augmentation system (SBAS) if the solar activity is not above the given threshold; and
   using the correspondingly standard ionospheric corrected pseudo-range measurements in the position calculation.

17. The method of claim 15, wherein performing one or more checking operations further includes, prior to evaluating the solar activity, checking if the receiver is in condition to correctly measure the solar activity.

* * * * *